Patented Mar. 19, 1935

1,994,752

UNITED STATES PATENT OFFICE 1,994,752

PROCESS OF PREVENTING DAMAGE BY TERMITES

Asa C. Chandler, Houston, Tex.

No Drawing. Application March 9, 1931,
Serial No. 521,400

4 Claims. (Cl. 167—14)

My invention relates to a process of fighting the attacks of termites upon buildings.

It is an object of the invention to provide a process for preventing termites from attacking buildings and for eliminating them after such attack has been initiated.

The process applies to treatment of buildings against the attack of ground-dwelling termites only, these being the kinds which are the cause of practically all the damage in most parts of the United States. As is well known these termites have their nests in the ground, most commonly under houses, and from these nests build tunnels or runways through the ground, and over the surface of foundations until they reach timbers into which they can burrow. Most of the methods now in use in keeping out or eradicating termites consist in the treatment of the wood, usually with creosote or some related substance, so that they will not enter the wood. In the course of time these substances disappear from the wood, and they are, therefore, not permanent. Some attempts have also been made to treat the ground with poisonous substances; the most commonly used substance is a 10% solution of sodium arsenite, although copper sulphate, borax, zinc chloride and other substances have been experimented with as substitutes. All of these substances are soluble and subject to gradual leaching away, especially if used in dilute solution; they are, therefore, not permanent.

I desire to provide a process of treating the soil which will make the same poisonous to termites for long periods so that it will be approximately permanently toxic to earth dwelling termites.

The process which I have invented consists in the application to the ground of a weak solution of a soluble copper salt, preferably copper sulphate, followed by the application of another solution which will precipitate the copper in the form of an insoluble substance which, therefore, cannot leach away. The chemical combination and precipitation are allowed to take place in the soil, and not before application, so that the precipitate will be very intimately mixed with the soil particles. Such a condition would not exist to the same degree if the chemicals were mixed first, and applied in the combined, precipitated condition. The effectiveness of the process consists in the fact that when the termites build their tunnels through the treated layer of coil, and over foundations to reach the wood on which they feed, they chew up the soil particles and associated insoluble copper compound and by means of some chemical change in their mouths or bodies convert enough of the copper into a soluble form so that it is destructive to them.

There are a number of chemical solutions which can be used to precipitate the copper into an insoluble form in the soil. On account of the bulkiness of the precipitate the best one appears to be sodium silicate, which converts the soluble copper into insoluble copper silicate. It is possible, however, to get essentially the same results with solutions of sodium and other carbonates, hydroxides, borax, etc. The strength of the solutions used is so adjusted that all or nearly all of the copper is precipitated; the quantity of solution used must depend to some extent on the nature of the soil, but should be enough to soak the soil to a depth of about two inches.

If copper sulphate and sodium silicate are the chemicals used, the strength of the sodium silicate should be approximately twice that of the copper sulphate. Results obtained up to the present time indicate that adequate strength is obtained by means of a 2% solution of copper sulphate, made by dissolving 8 pounds of powdered or granulated copper sulphate in 50 gallons of water, followed by a 4% solution of water glass, made by mixing two gallons of the commercial sodium silicate or "liquid glass" in 50 gallons of water. These strengths may be modified as the result of more extensive experience. The solutions can be applied easily by siphoning from a barrel through an ordinary garden hose. The solutions should be applied slowly enough so that they will soak into the ground where desired instead of running off on the surface, and a long enough interval should be allowed before the application of the second solution to permit the first to have soaked in thoroughly.

It would not make any essential difference if the order in which the solutions were applied should be reversed, except that the prior application of the copper solution, which is the toxic one, might allow it to penetrate the soil more deeply than if applied after the precipitating solution.

The solutions are not necessarily applied to all the ground under a house but may be applied to a strip perhaps two feet wide wherever any part of the foundation comes in contact with the ground. In some kinds of soil it may be necessary to dig and break it up, then smoothing the surface, before applying the solutions, this in order to facilitate soaking in. Before treatment it is necessary that all pieces of old lumber, shavings, etc., in contact with the ground should be removed.

The advantages inherent in this process of protection against termites are (1) that it is permanent in its effect, (2) that it is cheap, (3) that it is not injurious to either plants or animals, or in any way dangerous to apply, and (4) that there is no disagreeable odor or any other disagreeable effects resulting from its use.

What I claim as new is:

1. The process of protecting wooden materials and structures against the attacks of subterranean termites, consisting of treating the ground with a solution of a water-soluble salt of copper, which is poisonous to termites, and then converting this said solution into a water-insoluble metal salt by the application of an alkaline solution which will react with the water-soluble metal salt first used, and leave a water-insoluble compound in the form of a precipitate of very fine particles and intimately impregnating the soil particles therewith, so that when termites burrow through the treated soil they will ingest the poisonous particles and be destroyed by them.

2. A process applicable to acid as well as alkaline soils of protecting wooden materials and structures from the attack of subterranean termites, in which a water soluble copper salt is applied to the ground as a weak solution, and is precipitated in situ by the prior or subsequent treatment of the ground by the application of a solution of a soluble silicate.

3. A process of protecting wooden materials and structures from the attack of subterranean termites, in which a water-soluble copper salt is applied to the ground as a weak solution, and is precipitated in situ by the prior or subsequent treatment of the ground by the application of an aqueous solution of a salt of a weak oxy-acid of the group including silicates, borates, carbonates or bicarbonates.

4. A process as set forth in claim 3, but applicable only to neutral or alkaline soils, in which the precipitating agent is a hydroxide which will react with the copper solution to form an insoluble copper hydroxide.

ASA C. CHANDLER.